United States Patent
Koenig

[11] 3,871,695
[45] Mar. 18, 1975

[54] FOLDING TRUCK BUMPER

[76] Inventor: Robert W. Koenig, 405 Washington St., Sauk City, Wis. 53583

[22] Filed: Feb. 20, 1974

[21] Appl. No.: 444,109

[52] U.S. Cl. ................................................ 293/73
[51] Int. Cl. .......................................... B60r 19/04
[58] Field of Search ...... 293/73; 248/324, 325, 326, 248/486; 273/1.5 R

[56] References Cited
UNITED STATES PATENTS

| | | | |
|---|---|---|---|
| 2,872,192 | 2/1959 | Margetts et al. | 273/1.5 R |
| 3,210,110 | 10/1965 | Chieger | 293/73 |
| 3,371,903 | 3/1968 | Thompson | 248/486 |

Primary Examiner—Richard A. Schacher
Assistant Examiner—Robert Saifer

[57] ABSTRACT

A folding bumper for an over-the-road vehicle is attached to the underside of and to the rear of the vehicle frame. Structurally it includes a bumper plate assembly which, in the extended bumper position, depends from a pivotal connection to the frame generally at right angles to the frame. The folding bumper also includes support arms extending from pivotal connections to the frame, connections spaced horizontally from the pivotal connection of the bumper plate assembly to the frame, to releasable connections at the lower end of the bumper plate assembly. Removable pins make the connection between the support arms and the bumper plate assembly to lock the bumper plate assembly in its extended position. To permit movement of the folding bumper to its collapsed position, the pins are removed freeing the bumper plate assembly and support arms for pivotal movement toward a generally horizontal position. The pins are inserted through an opening provided in the support arm intermediate its ends and again through an opening in the bumper plate assembly to hold both the support arms and the bumper plate assembly in a generally horizontal position adjacent the underside of the frame, i.e. in a folded or collapsed position.

5 Claims, 4 Drawing Figures

PATENTED MAR 18 1975 3,871,695

3,871,695

FOLDING TRUCK BUMPER

BACKGROUND OF THE INVENTION

This invention relates to over-the-road truck type vehicles and, more particularly, to a folding bumper arrangement for use on such vehicles.

Because of Federal Department of Transportation regulations, which have also been adopted by a number of individual states, a truck bumper is required any time the truck bed, or any other part of the vehicle, has any more than a 24 inch overhang with respect to the rear wheels and is at least 30 inches above the road bed. In many instances it may be desirable to have a bumper assembly which can be folded so as to clear the area under the just referred to overhang. For example, if the overhang is part of a vertically movable platform, it would be desirable to collapse the bumper to permit unrestricted vertical movement of the platform. Also, if it is desired to attach a trailer to the rear of the vehicle, the trailer hitch is generally provided behind the bumper and being able to collapse the bumper makes the trailer hitch more readily accessible. Another instance where it may be desirable to have a collapsible bumper assembly is where the vehicle may be backed up to a loading dock. This invention is concerned with the provision of an effective truck bumper but one which can be selectively collapsed to accommodate the above, or other, encountered conditions.

SUMMARY OF THE INVENTION

Among the general objects of this invention are to provide an effective, economical, and versatile folding bumper assembly and one in which all of the parts thereof are virtually self-contained.

For the achievement of these and other objects, this invention contemplates an arrangement wherein a bumper plate assembly is provided which has a pivotal connection to the vehicle frame about which it is movable between a first generally vertical extended position and a second, generally horizontal collapsed position. A support is provided to hold the bumper plate assembly selectively in either the extended or collapsed positions. Preferably, the arrangement includes two connections between the support and the bumper plate assembly corresponding one to each of the bumper plate assemblies positions and permitting movement of the bumper plate assembly and the support relative to each other and the vehicle frame to assume either the extended or collapsed positions.

Other objects and advantages will be pointed out in or be apparent from, the specification and claims, as will obvious modifications of the embodiment shown in the drawings, in which:

DESCRIPTION OF THE PREFERRED EMBODIMENT

Figure 1:
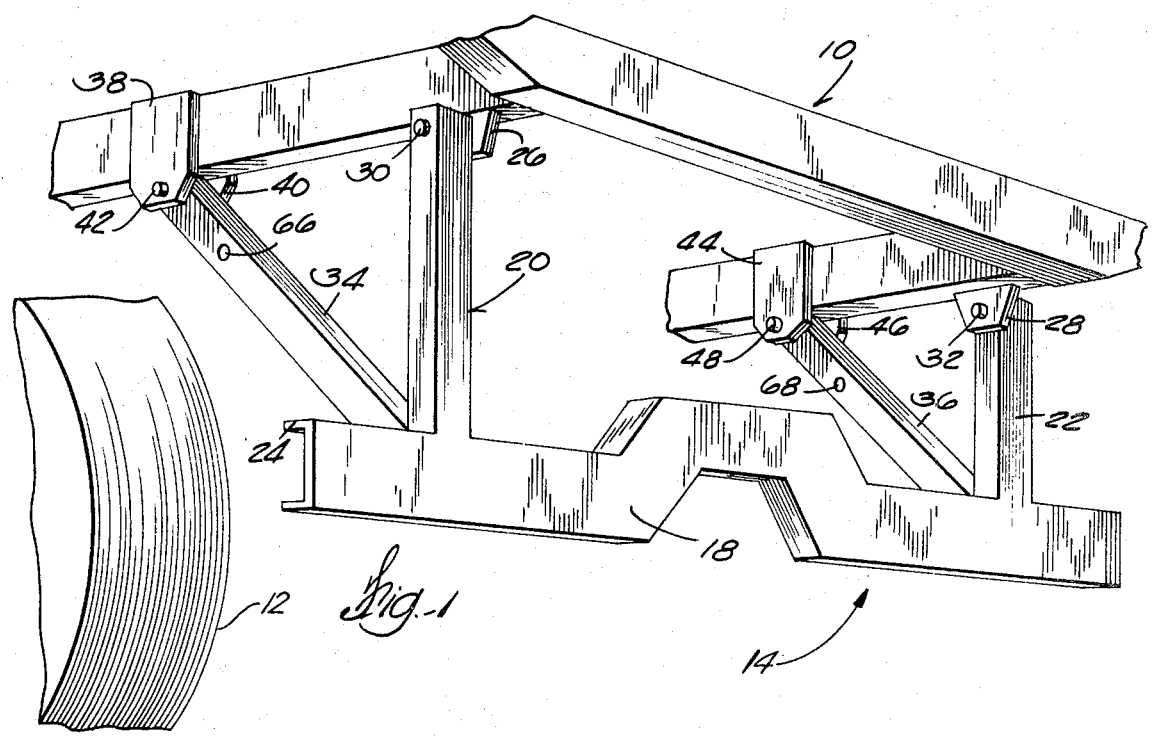
FIG. 1 is a perspective view of a portion of a vehicle frame illustrating the folding bumper in the extended position.

With particular reference to the drawings, for convenience, only a portion of an over-the-road vehicle such as a truck has been illustrated, this consists of the rear portion 10 of the truck frame and a rear wheel 12.

The folding bumper assembly 14 is connected to the underside of frame 10, i.e. the portion of the frame which overhangs rear wheel 12 so that the assembly, when extended, functions as a rear bumper.

The overall assembly includes a bumper frame assembly 16 which consists of a horizontal channel 18 and a pair of spaced structural arms 20 and 22. Arms 20 and 22 are preferably welded to the upper leg 24 of channel 18. Each of the arms 20 and 22 are pivotally connected to frame 10 by means of brackets 26 and 28, which are welded to and extend downwardly from the frame, and pins 30 and 32 which extend through aligned openings in the upper ends of arms 20 and 22 and respective ones of brackets 26 and 28. With this arrangement bumper plate assembly 16 is supported for pivotal movement about a horizontal axis defined by pins 30 and 32.

A mechanism is also provided to establish an extended and a collapsed position of the bumper assembly and to lock the bumper plate assembly in one or the other of those positions relative to the vehicle frame. The preferred embodiment, as illustrated, includes two support arms 34 and 36, however only one arm can be used if desired.

Figure 4:
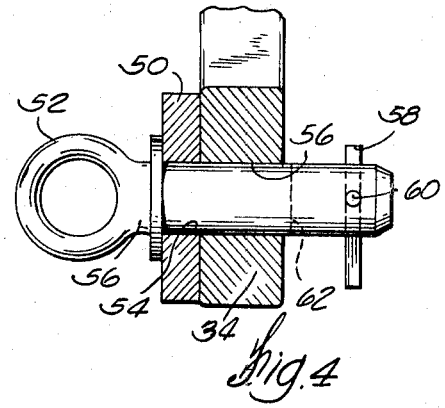
FIG. 4 is a section view along lines 4—4 of FIG. 2.

Support arm 34 has a pivotal connection to frame 10 by means of plates 38 and 40 fixed to the frame and pin 42 which extends through aligned holes in plates 38 and 40 and the upper end of support arm 34. Similarly, the upper end of support arm 36 is pivotally connected to frame 10 by means of plates 44 and 46 affixed to the frame and a pin 48 which extends through aligned openings in those plates and the upper end of the support arm. The lower ends of each of the support arms has a releasable connection to a pair of spaced plates 50 connected to channel 18. Only one plate 50 is illustrated in the drawings, the construction of each plate and its connections to the channel and support are identical and therefore the description of one should suffice for both. A pin 52 extends through hole 54 in plate 50 and hole 56 in support arm 34. The pin has a swinging key 58 which is free to pivot in key way 62 about pin 60. Key 58 will normally assume the position illustrated in FIG. 4 but can be swung to a horizontal position to permit withdrawal or insertion of the pin into the aligned holes. When in the position of FIG. 4, accidental removal of the pin is prevented.

Figure 2:
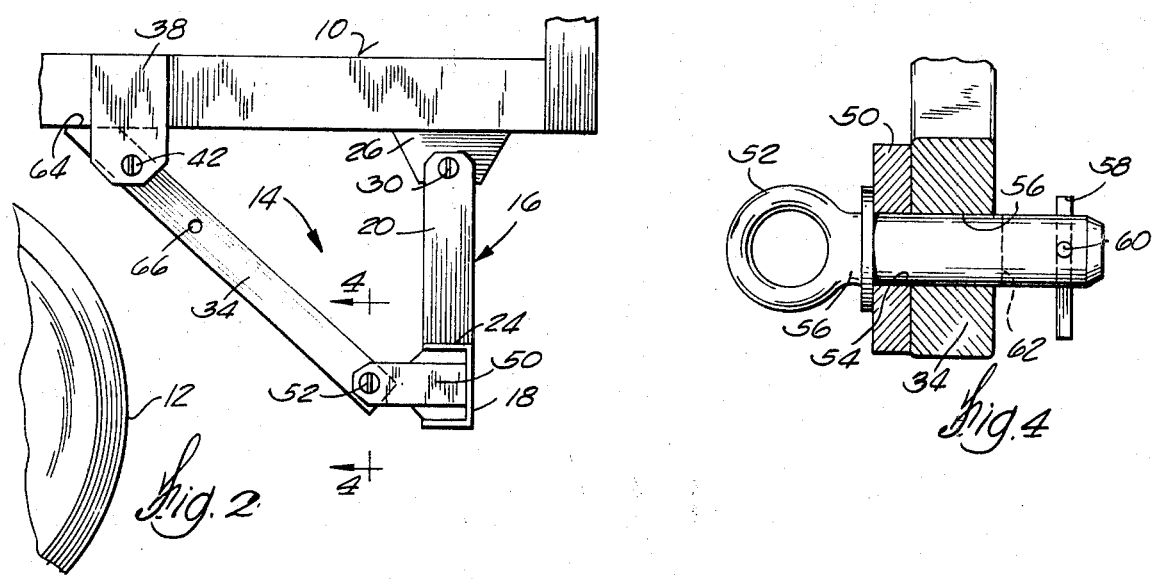
FIG. 2 is a side elevation of the bumper in the extended position.

With the holes 54 and 56 aligned and the pin 56 inserted therethrough, the bumper plate assembly is locked in the extended position of FIG. 2. To further insure that the bumper plate assembly is locked in that position, means is provided to limit movement of support arms 34 and 36, and correspondingly the bumper plate assembly. Preferably, this means takes the form of angled surface 64 at the upper end of support arm 34, and a similar surface (not illustrated) provided on support arm 36. When the support arm is pivoted to register with plate 50 in the extended position of the bumper plate assembly, surface 64 engages frame 10 preventing further clockwise motion of the support arm and correspondingly clockwise motion of bumper plate assembly 16. With this arrangement, the bumper plate assembly will resist any impact from the right as illustrated in FIG. 2 which would otherwise tend to displace the bumper plate assembly in a clockwise direction.

Figure 3:
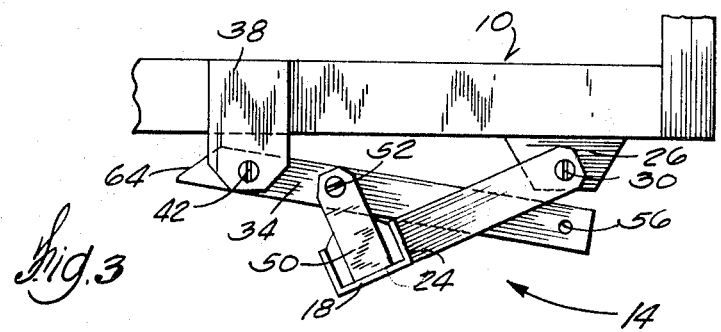
FIG. 3 is a side elevation of the bumper in the collapsed position.

By withdrawing pin 52, and the similar pin from support arm 36 and its plate 50, the bumper plate assembly and support arm are freed to move from the extended position of FIG. 2 to the collapsed position of FIG. 3. To lock the support and the bumper plate assembly in the folded or collasped position, second openings for receipt of pins 52, i.e. openings 66 and 68, are provided in each of the support arms. With pins 52 removed, support arms 34 and 36 are swung in a counterclockwise direction toward a generally horizontal position while bumper plate assembly 16 is swung in a clockwise direction toward its generally horizontal position. During this swinging movement, openings 54 and plates 50 will come into alignment with openings 66 and 68 in support arms 34 and 36. When that alignment occurs pins 52 are inserted in the aligned holes locking the bumper assembly in the collapsed position illustrated in FIG. 3 thereby clearing the area under the frame overhang.

Support arms 34 and 36 and arms 20 and 22 have a box construction but other structural forms can be used and forms other than a channel can be used for plate 18.

The described arrangement provides an effective and structurally sound bumper assembly when that assembly is extended as illustrated in FIGS. 1 and 2. Utilizing the same basic structural elements and connecting elements, the bumper assembly can be folded to a collapsed position and locked in that position when the bumper is not required.

Although but one embodiment of the present invention has been illustrated and described, it will be apparent to those skilled in the art that various changes and modifications may be made therein without departing from the spirit of the invention or from the scope of the appended claims.

I claim:

1. A folding bumper for use in connection with an over-the-road vehicle having a frame, the folding bumper comprising, in combination, a bumper plate assembly, first hinge means for pivotally connecting the bumper plate assembly to the vehicle frame and defining a generally horizontal pivot axis, said first hinge means supporting said bumper plate assembly for pivotal movement about said pivot axis between a first, generally vertical extended position and a second, generally horizontal collapsed position, a support arm, second hinge means spaced horizontally from said first hinge means and defining a generally horizontal pivot axis for said support arm and about which said support arm pivots between an extended and a collapsed position to hold said bumper plate assembly respectively in said first and second positions, means defining a first hole in said bumper plate assembly and second and third holes spaced along said support arm, said second and third holes being selectively registerable with said first hole, and pin means releasably receivable in said first, second and third holes and including means for locking said pin means in said registered first and second holes or said first and third holes, whereby insertion of said pin means in said first and second holes locates and locks said bumper plate assembly in said extended position and said pin means inserted in said first and third holes locks said bumper plate assembly in said collapsed position.

2. The combination of claim 1 including motion limiting means engageable between said support arm and said frame to limit movement of said support arm and correspondingly said bumper plate assembly when said bumper plate assembly is located and locked in said extended position.

3. The combination of claim 2 wherein said support arm is generally elongated, and said motion limiting means comprises means defining an angular surface at the end of said support arm adjacent said second hinge means, said angular surface engaging said frame means when said support arm's second hole is registered with said bumper plate assembly first hole.

4. The combination of claim 2 wherein said support arm is generally elongated and said second hole is positioned adjacent the end of said support spaced from said second hinge means and said third hole is positioned intermediate the ends of said support arms.

5. A folding bumper for use in connection with an over-the-road vehicle having a frame, the folding bumper comprising, in combination, a bumper plate assembly, hinge means for pivotally connecting the bumper plate assembly to the vehicle frame and supporting said bumper plate assembly for pivotal movement between a first extended position and a second collapsed position, structural support means associated with and operative to hold said bumper plate assembly selectively in one of said first and second positions, means mounting said support means for movement relative to said frame between a first extended position for supporting said bumper assembly in its extended position and a second collapsed position, and locking means including first means on said bumper plate assembly and second and third means relatively spaced on said support means, said second and third means selectively connectable with said first means when said bumper plate assembly and said support means are in said extended and collapsed position and, when so connected, operative to hold said bumper plate assembly in one of said first and second bumper plate assembly's positions and further operative, when not connected, to free said bumper plate assembly and support means for movement relative to each other and the vehicle frame.

* * * * *